March 26, 1957     A. M. LEWIS     2,786,932
FOOD STEAMER
Filed Aug. 29, 1955     2 Sheets-Sheet 1
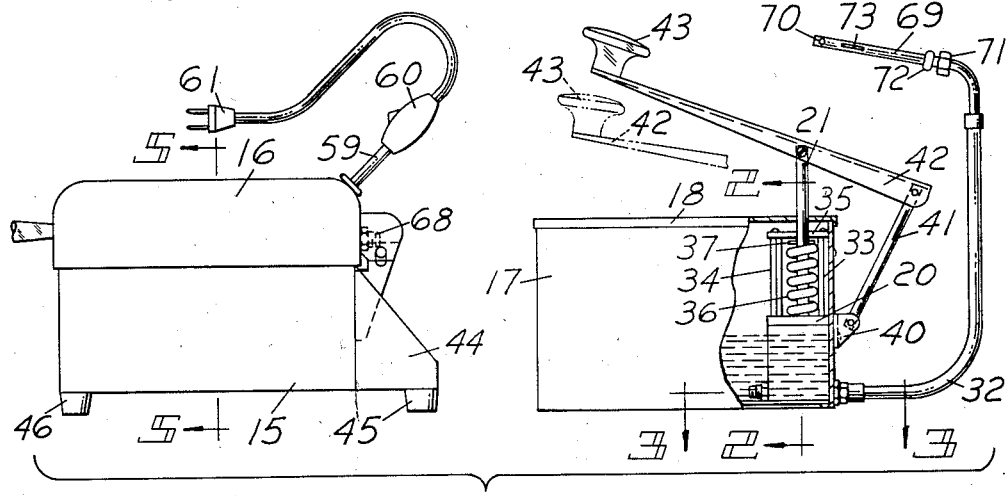
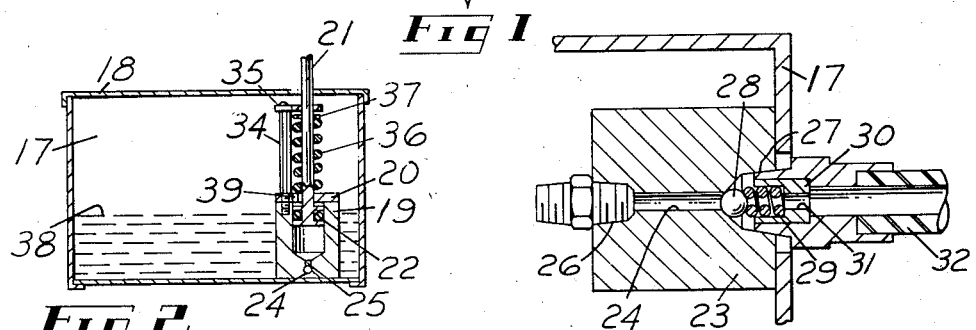
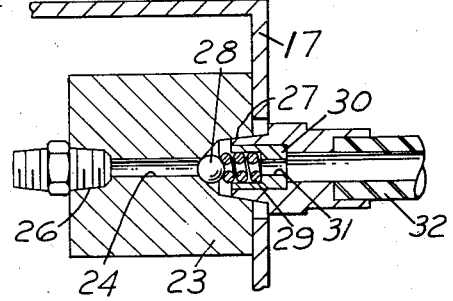
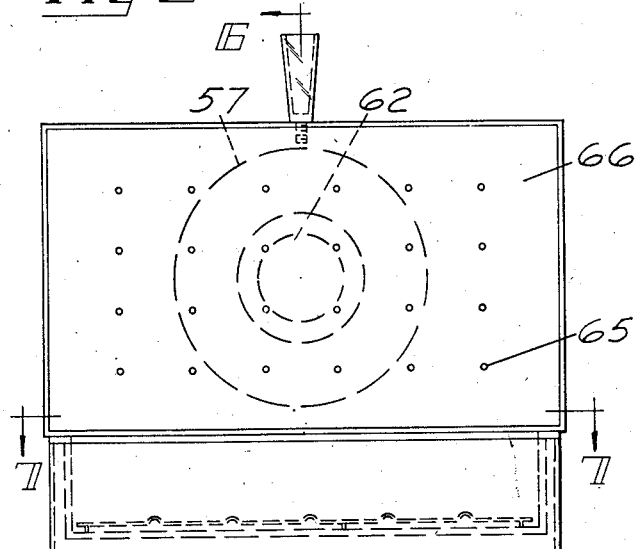
INVENTOR.
ALBERT M. LEWIS
BY
ATTORNEY March 26, 1957  A. M. LEWIS  2,786,932
FOOD STEAMER
Filed Aug. 29, 1955  2 Sheets-Sheet 2
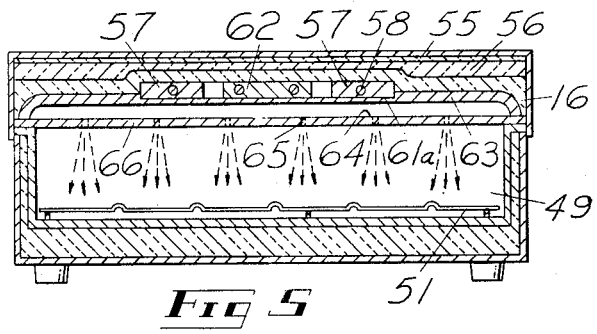
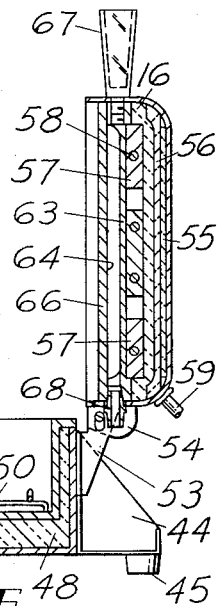
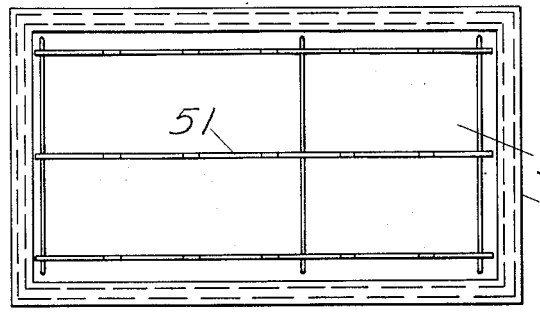
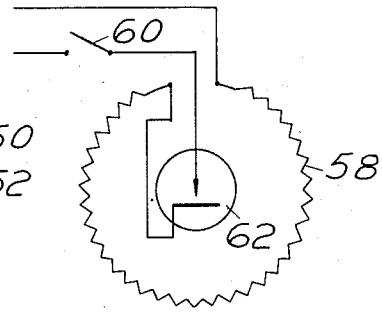
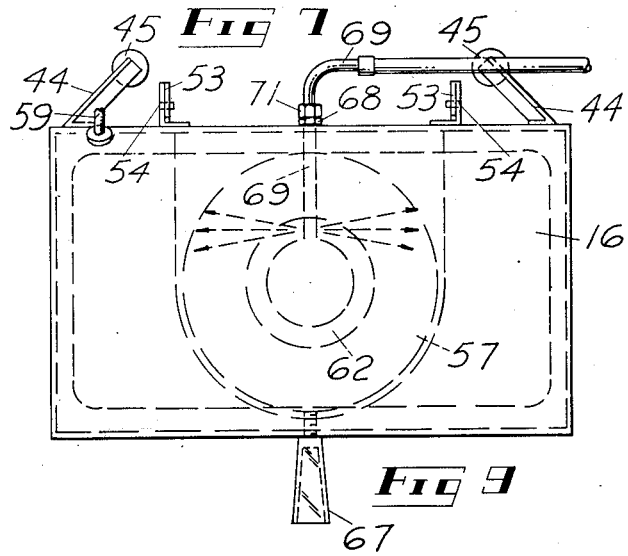
INVENTOR.
ALBERT M. LEWIS
BY
*Thos S Donnelly*
ATTORNEY

United States Patent Office 2,786,932
Patented Mar. 26, 1957

2,786,932
FOOD STEAMER
Albert M. Lewis, Grosse Pointe Woods, Mich.
Application August 29, 1955, Serial No. 531,227
5 Claims. (Cl. 219—38)

My invention relates to a new and useful improvement in a food steamer adapted particularly for steaming rolls, buns and the like.

The invention has a compartment in which the product to be steamed is placed. A cover fits over the compartment and serves to close the same and then a quantity of water is delivered to the interior of the cover and immediately transformed into steam which is ejected from the cover thru small openings into the compartment which receives the material to be steamed. A difficulty has been encountered in the use of such devices, due particularly to mineral matter contained within the water, this mineral matter being principally calcium. The perforations through which the steam would be ejected would become clogged and there is no way to clean the structure and maintain it in a sanitary condition.

It is an object of the present invention to provide a structure whereby the various parts may be easily separated and removed for cleaning purposes.

Another object of the invention is the provision of a steamer of this class which will be simple in structure, economical of manufacture, durable, compact and highly efficient in use.

Another object of the invention is a steamer of this class whereby a prescribed amount of liquid may be injected into the steamer chamber.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings in which,

Fig. 1 is a side elevational view of the invention with parts broken away,

Fig. 2 is a sectional view taken on line 2—2 of Fig. 1,

Fig. 3 is a fragmentary, enlarged sectional view taken on line 3—3 of Fig. 1,

Fig. 4 is an elevational view of the food container and steam generator with the cover elevated to upright position, Fig. 5 is a longitudinal vertical sectional view through the food container and steam generator, Fig. 6 is a sectional view taken on line 6—6 of Fig. 4, Fig. 7 is a view taken on line 7—7 of Fig. 4 with parts removed, Fig. 8 is a wiring diagram of the invention, Fig. 9 is a top plan view of the food container and steam generator with the cover closed.

In Fig. 1 I have indicated the food container 15 with the cover 16 which is used as a steam generator. Positioned adjacent this structure, and cooperating therewith, is a water container 17 having a cover 18. Positioned in this container 17 and extending slightly above the normal water level 38 is a cylinder 19 closed at its upper end by a cover 20, in which is formed a bleed opening 39. A piston rod 21 is connected to the plunger or piston 22 which slides in the cylinder 19. This piston rod projects through the cover plate 20 and through the cover 18.

Formed in the lower portion 23 of this cylinder 19 is a passage 24, which communicates by the lateral passage 25 with the interior of the cylinder 19. Connected in one end of the passage 24 is a fitting 26. A fitting 27 is connected to the opposite end of the passage 24 and extends outwardly of the container 17. Each of these fittings 26 and 27 is provided with a ball check valve, embodying the ball 28, the spring 29 and a sleeve 30, in which one end of the spring 29 engages and which is provided with a passage 31 to communicate with the conduit 32.

The check valve in the fitting 26 is such that upon upward movement of the plunger 22, this check valve will open and permit water to enter the cylinder 19 while at the same time the check valve in the fitting 27 will close and prevent water from passing outwardly through the fitting 27. Upon downward movement of the plunger 22 the valve in the fitting 26 will close, and the valve in the fitting 27 will be opened under pressure of the water, permitting the water to pass outwardly from the cylinder 19 through the conduit 32.

Extending through the cover 20 are the threaded ends of upwardly extending rods 33 and 34, to which is secured a cross-bar 35, through which the piston rod 21 extends. Embracing this rod 21 and engaging at its lower end with the plate 20 is a spring 36, the upper end of which engages a pin 37 projected through the rod 21. Consequently the spring 36 serves to retain the plunger in elevated position in the cylinder 19.

Mounted on one wall of the container 17 is a lug 40, to which is pivotally connected one end of a link 41, the opposite end of which is pivotally connected to the lever 42 carrying at its free end the knob 43. The upper end of the piston rod 21 is pivotally connected to this lever 42 between the ends thereof. The lever may be rocked downwardly to the dotted line position shown in Fig. 1, and when rocked into this position the plunger will have been moved downwardly and will have expelled a predetermined amount of liquid from the cylinder 13.

Secured to and projecting outwardly from one side of the food generator 15 are brackets 44, each of which carries a foot 45 cooperating with the foot 46, secured to and projecting downwardly from the bottom 47 of the food container, so that this structure, when placed upon a suitable support, will rest level.

The container 15 is lined with a layer of insulation 48 and positioned within this member 15 is a box-like structure 49, on the bottom 50 of which rests a tray or rack 51. This box-like serves as a compartment for reception of buns, rolls or other articles which are to be steamed.

A flange 52 of this box-like structure 49 overlies and rests upon the upper edges of the member 15.

Secured to and projecting outwardly from the member 15 are hinge-plates 53 to which are pivoted hinge-plates 54 which are secured to and project outwardly from one side of the member 16. Thus the cover is hingedly mounted and may be swung to closed position as shown in Fig. 1, and to open position as shown in Fig. 4 and Fig. 6.

This cover is also of box-like formation and positioned within the cover is a layer 55 of asbestos resting upon a layer 56 of other type of heat insulation. Positioned with the cover is a metallic annulus 57 which carries the electric heating element 58. This heating element 58 is connected through the thermostat 62, and by means of the cable 59 through the switch 60 and the socket-plug 61 to a suitable source of electrical energy.

A casting embodying the walls 63 and 66, which are spaced apart, is positioned within the cover 16, and these spaced-apart walls provide a steam generating chamber 64, the walls 66 being provided with perforation 65, through which the steam may issue into the food chamber or container 49.

A handle 67 projects through one side of the cover 15 and threads into the casting which embodies the walls 63 and 66. Threaded into this casting so as to communicate with the chamber 64 is a fitting 68 which projects outwardly through one wall of the cover 16, as clearly shown in Fig. 6. This fitting 68 and the handle 67 therefore serve to retain the casting in position in the cover. As shown in Fig. 5 the wall 63 is provided with a depression or recess 61a in which the annulus 57 engages.

A metal conduit 69 is secured in communication with the conduit 32, which is flexible. This conduit 69 has openings 70 formed adjacent its end and the slit 73. A knob 72 is formed on the metal conduit 69 on which is positioned a nut 71. This metal conduit 69 is projected through the fitting 68 as shown in Fig. 9, and the nut 71 is threaded on this fitting 68 to provide a leak-proof connection.

In use the switch 60 would be closed, and a predetermined amount of heat would be generated to maintain a constant heat of a pre-determined temperature in the chamber 64. When the food products are placed on the tray 51 and the cover closed, the operator would then press downwardly on the knob 43 to inject a pre-determined amount of water into the chamber 64, which would immediaIy be turned into steam, this steam issuing as jets through the openings 65 would serve to steam the food products. It will be noted that the heating is practically instantaneous.

Other articles of food besides bread products may be placed in the member 49, such as vegetables, soup, beef-stew, and the like, which are commonly served at lunch counters where sandwiches are also served.

In order to remove the casting embodying the walls 63 and 66, it is but necessary to unscrew the handle 67. This casting may then be removed by tilting downwardly and drawing forwardly to withdraw the fitting 68 from the opening in the cover 16. This would permit a cleaning of the perforations and a cleaning of the steam generating chambers 64 by a flushing operation. At the same time the heating element and the thermostat would be exposed, rendering these parts accessible for adjustment, repair or replacement.

Experience has shown that with a steamer of this class, constructed in this manner, the disadvantages heretofore mentioned, are avoided, and a highly efficient structure is obtained.

What I claim is:

1. In a mechanism of the class described, a structure having a compartment therein for reception of separate articles; a box-like cover hingedly mounted on said structure, an electric heating element positioned in said cover; a thermostat in said cover for controlling said heating element; insulation for insulating said heating element from said cover; a metallic steam generator positioned in said cover and comprising a pair of spaced apart walls to provide a steam generating chamber, one of said walls, upon closing of said cover, facing said article-receiving compartment and having a plurality of spaced apart perforations formed therein; a tubular fitting secured to said steam generator and projecting through one side of said cover and communicating with the steam generating chamber; and a handle projecting through the opposite side of said cover and threaded into said steam generator for cooperating with said conduit for retaining said steam generator in fixed relation to said cover.

2. In a mechanism of the class described, a structure having a compartment therein for reception of separate articles; a box-like cover hingedly mounted on said structure; an electric heating element positioned in said cover; a thermostat in said cover for controlling said heating element; insulation for insulating said heating element from said cover; a metallic steam generator positioned in said cover and comprising a pair of spaced apart walls to provide a steam generating chamber, one of said walls, upon closing of said cover, facing said article-receiving compartment and having a plurality of spaced apart perforations formed therein; a tubular fitting secured to said steam generator and projecting through one side of said cover and communicating with the steam generating chamber; and a handle projecting through the opposite side of said cover and threaded into said steam generator for cooperating with said conduit for retaining said steam generator in fixed relation to said cover; and a conduit extending into said generating chamber for conducting liquid thereinto.

3. In a mechanism of the class described, a structure having a compartment therein for reception of separate articles; a box-like cover hingedly mounted on said structure, an electric heating element positioned in said cover; a thermostat in said cover for controlling said heating element; insulation for insulating said heating element from said cover; a metallic steam generator positioned in said cover and comprising a pair of spaced apart walls to provide a steam generating chamber, one of said walls, upon closing of said cover, facing said article-receiving compartment and having a plurality of spaced apart perforations formed therein; a tubular fitting secured to said steam generator and projecting through one side of said cover and communicating with the steam generating chamber; and a handle projecting through the opposite side of said cover and threaded into said steam generator for cooperating with said conduit for retaining said steam generator in fixed relation to said cover; and a conduit extending into said generating chamber for conducting liquid thereinto, and manually operable means for delivering liquid into said liquid delivering conduit in predetermined amounts.

4. In a mechanism of the class described, a structure having a compartment therein for reception of separate articles; a box-like cover hingedly mounted on said structure, an electric heating element positioned in said cover; a thermostat in said cover for controlling said heating element; insulation for insulating said heating element from said cover; a metallic steam generator positioned in said cover and comprising a pair of spaced apart walls to provide a steam generating chamber, one of said walls, upon closing of said cover, facing said article-receiving compartment, and having a plurality of spaced apart perforations formed therein; a tubular fitting secured to said steam generator and projecting through one side of said cover, and communicating with the steam generating chamber; a handle projecting through the opposite side of said cover and threaded into said steam generator for cooperating with said conduit for retaining said steam generator in fixed relation to said cover; and a metallic conduit projected through said fitting for delivering liquid into said generating chamber.

5. In a mechanism of the class described, a structure having a compartment therein for reception of separate articles; a box-like cover hingedly mounted on said structure, an electric heating element positioned in said cover; a thermostat in said cover for controlling said heating element; insulation for insulating said heating element from said cover; a metallic steam generator positioned in said cover and comprising a pair of spaced apart walls to provide a steam generating chamber, one of said walls, upon closing of said cover, facing said article-receiving compartment and having a plurality of spaced apart perforations formed therein; a tubular fitting secured to said steam generator and projecting through one side of said cover and communicating with the steam generating chamber; and means projecting through the opposite side of said cover and into said steam generator for cooperating with said conduit for retaining said steam generator in fixed relation to said cover.

References Cited in the file of this patent

UNITED STATES PATENTS

| 2,396,578 | Kittel et al. | Mar. 12, 1946 |
| 2,674,935 | Lewis et al. | Apr. 13, 1954 |
| 2,719,211 | Lewis et al. | Sept. 27, 1955 |